United States Patent [19]
Riel

[11] 3,747,197
[45] July 24, 1973

[54] METHOD OF MAKING A RIBBED PANEL
[75] Inventor: Frank J. Riel, San Diego, Calif.
[73] Assignee: Rohr Industries, Inc., Chula Vista, Calif.
[22] Filed: Nov. 9, 1971
[21] Appl. No.: 197,018

[52] U.S. Cl. .................. 29/470.9, 29/471.3, 29/480, 29/497.5
[51] Int. Cl. ............................................. B23k 1/20
[58] Field of Search ...................... 29/470.9, 471.1, 29/471.3, 493, 497.5, 480, 502

[56] References Cited
UNITED STATES PATENTS

| | | | |
|---|---|---|---|
| 3,071,853 | 1/1963 | Price et al. | 29/497.5 X |
| 3,419,951 | 1/1969 | Carlson | 29/470.1 |
| 3,427,706 | 2/1969 | Jaffe | 29/471.1 |
| 3,460,233 | 8/1969 | Pfaffenberger et al. | 29/497.5 X |
| 3,533,153 | 10/1970 | Melill et al. | 29/471.1 X |
| 3,533,156 | 10/1970 | Klimmek et al. | 29/493 X |
| 3,590,466 | 7/1971 | Moshammer | 29/471.3 |

Primary Examiner—Richard B. Lazarus
Attorney—George E. Pearson

[57] ABSTRACT

A pair of generally tubular titanium members of different diameter are mounted, one within the other and in radially spaced relation to each other, with the inner one fitted around a mandrel having a greater coefficient of thermal expansion than at least the outermost of the two tubular members. A multiplicity of rib members are fitted, spoke-like between the inner and outer tubular members with at least one radially directed surface of each of a selected plurality of the rib members plated with successive layers of selectively applied plating metals. The two tubular members, at least on the surface portions thereof which contact plated surfaces of the rib members, are chemically clean, so that upon heating the assembled parts to a temperature sufficient to liquify the plating metals, the mandrel causes, and thereby expands the inner tubular member to expand at a rate greater than the outer tubular member sufficiently to place the rib members in compression between the two tubular members. The combined heat and pressure is continued to produce atomic transport of the basis metals across the liquid interfaces to develop a diffusion bond at each such interface. Conventional brazing stop-off compound may be applied to selected contacting surfaces of any of the rib members where such bonding is not desired. Upon completion of the bonding, the rib members are freed for lateral separation at one end thereof or the other, after which one or both of the tubular members having rib members bonded thereto may be flattened to comprise a ribbed panel.

9 Claims, 9 Drawing Figures

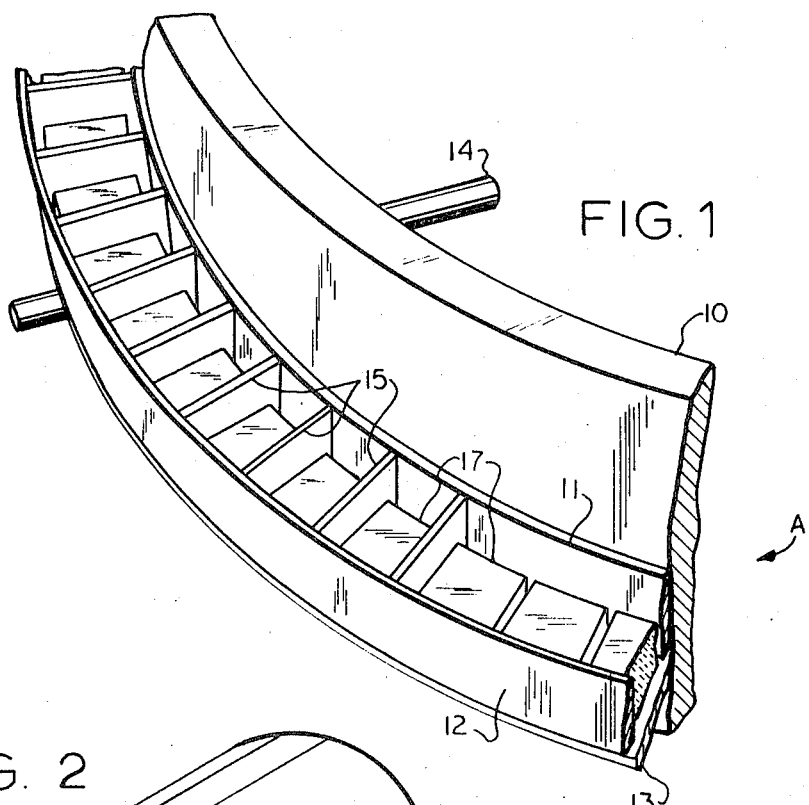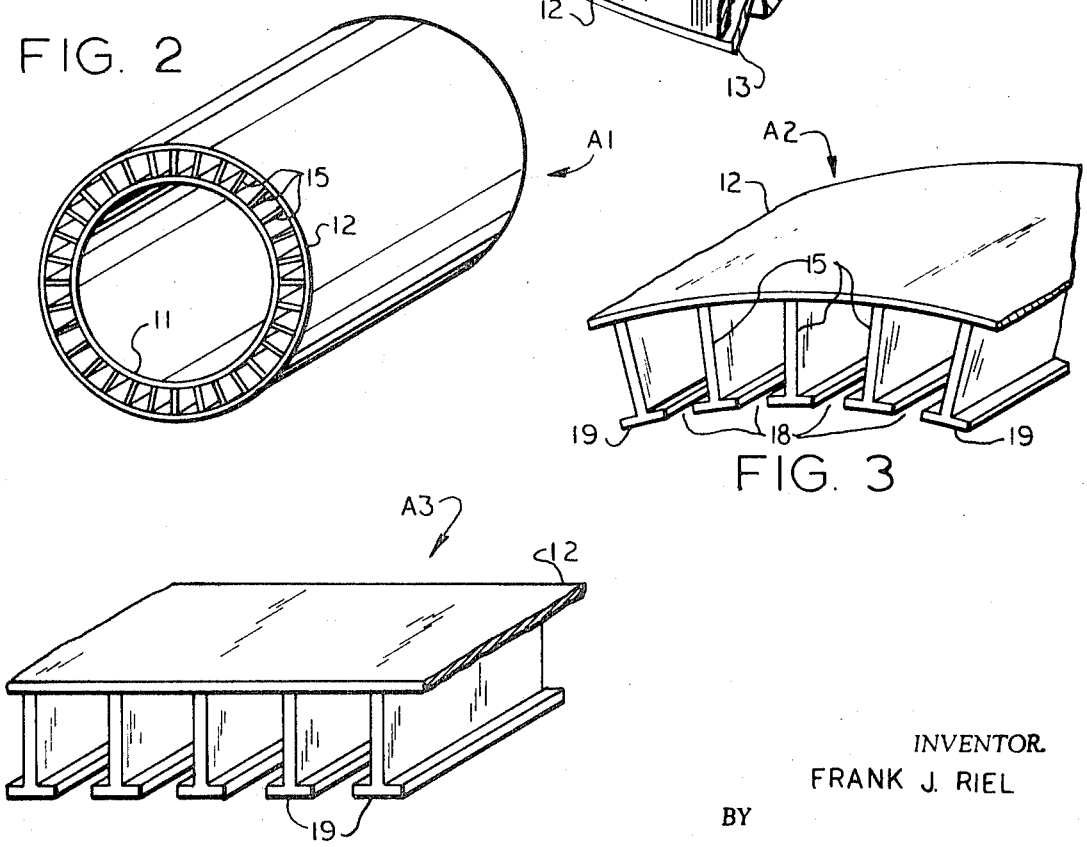

INVENTOR.
FRANK J. RIEL

BY

ATTORNEY

METHOD OF MAKING A RIBBED PANEL

BACKGROUND OF THE INVENTION

In the past, when making a ribbed plate or pane with ribs diffusion bonded thereto, it hasbeen customary to clean the plate and to plat with selected layers of selected plating materials, a surface of each rib element which is to be bonded to a plate. The ribs are then assembled on the plate and subjected to suitable compression, as by means of a hydraulic or other press or clamp means. The parts under compression are heated to render liquidus the plating material and thereby provide a liquid interface at each zone of diffusion bonding. The parts are retained under compression at bonding temperature until atomic transport of the basis metals across each interface completes the diffusion bonding of the ribs to the plate. Any irregularity in the height of the ribs, or in the thickness of the plate, has a deleterious effect on the reslltant bond. Also, such prior method requires the use of expensive equipment, which of course affects the cost of the product.

PURPOSE OF THE INVENTION

A primary objective of the present invention is to make a ribbed plate or panel by fitiing a plurality of rib members between two generally tubular members of different diameter mounted one within the other and with the inner one ftted onto a mandrel having a higher coefficient of thermal expansion than at least the outermost of the tubular members. At least one radially directed surface of each of a selected plurality of the rib members is plated with selected plating material. The assembly is heated to liquidus temperature of the plating matrial, and heating is continued at diffusion bonding temperatures to complete a diffusion bond across each liquid interface. The assembly is then cooled, the mandrel removed, and the ribs freed at one end thereof for lateral separation, whereby the rib members attached at their other ends by bonding to one of the other tube-like members comprise, with such other tube-like member, an annular ribbed plate, which can then be severed between two selected ribs and flattened as required to provide a ribbed panel.

BRIEF DESCRIPTION OF THE DRAWINGS

The foregoing objectivs and advantages of the invention will be apparent from the following description and the accompanying drawings, wherein:

FIG. 1 is a fragmenary, perspective view of a portion of an assembly of parts in a fixture as a step in practicing the present invention.

FIG. 2 is a perspective view in smaller scale of a ribbed assembly, similar to FIG. 1, but longer, upon completion of the diffusion bonding of the rib members to the inner and outer tube-like members and removal of the mandrel.

FIG. 3 is an enlarged, fragmentary view of a portion of a circular, diffusion bonded assembly generally similar to that shown in FIG. 2 after the inner annular member has been sawed apart midway between adjacent rib members to form a ribbed, cylindrical plate.

FIG. 4 is a view generally similar to FIG. 3 after the outer circular member has been severed and flattened to form a flat, ribbed panel.

DETALED DESCRIPTION OF THE DRAWINGS

Figure 5:
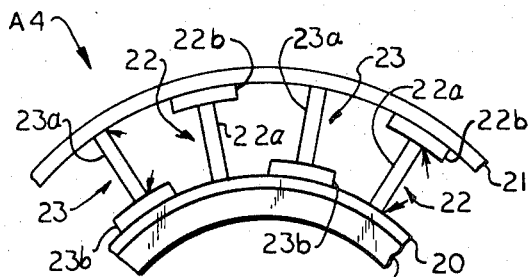
FIGS. 5, 6 and 7 show modified forms of the invention which require no cutting operation to permit lateral separation of the end portions of the rib members.

Referring to the drawings in detail, and initially to the sequence of operations repreeented by FIGS. 1 — 4, an annular mandrel 10 of suitable length, strength and thickness, and of a suitable material, for example steel, having a greater coefficient of thermal expansion than the remainder of the assembly, is fitted into an inner annular member 11 of suitable metal plate, herein assumed to be titanium. The inner annular member 11, and an outer annular member 12, also herein assumed to be titanium, are mounted on a circular, washer like shelf 13 supported on a plurality of radially extending pins 14. The outer annular member 12 is of a selected larger diameter than, and is spaced radially from, the inner annular member 11. As illustrated, the annular members 11 and 12 are cylindrical and co-axial, but these are not essential features provided other requirements of the invention are met as described and claimed herein.

A plurality of rib members 15, also assumed to be titanium, are fitted spoke-like between the inner and outer annular members 11 and 12, intermediate spacing and positioning members 17 of suitable material, such as a ceramic, preferably being employed to facilitate such positioning.

Before fitting the rib members 15 between the inner and outer annular members 11 and 12, a selected one or both ends of a selected plurality of the rib members 15 are cleaned, and one or both ends of selected ones thereof are plated with one or more selected brazing type metals. Also, the surface portions of one or both annular members 11 and 12, at least in areas thereof to be contacted by plated portions of the rib members 15, are thoroughly cleaned. In the sequence of operations depicted in FIGS. 1 – 4 it is assumed that both ends of all of the rib members 15 are so plated.

After all of the rib members 15 have been inserted in the manner shown in FIG. 1, the complete assembly A of FIG. 1 is placed in a suitable, bonding furnace, not shown, wherein the assembly is subjected to bonding by being heated in an inert atmosphere, such as argon, or in a suitably hard vacuum, as disclosed for example in U. S. Pat. No. 3,468,774. During this procedure the assembly A is heated to a temperature sufficient to render liquidus the plating material, and is maintained at diffusion bonding temperature for a period sufficient to cause atomic transport of the basis metals across each liquid interface, and diffusion of the plating metals in the zone of the bond.

The assembly A is then cooled, and the now integrally bonded sub-assembly A1 shown in FIG. 2, and comprising the inner and outer annular members 11 and 12, and rib members 15 are removed from the mandrel 10. The sub-assembly A1 shown in FIG.2 is, however, longer than the component parts shown in FIG. 1.

Cuts 18, see FIG. 3, are made in the inner annular member 11 midway between each adjacent pair of rib members 15 to form integrally bonded T-shape ribs 19. The ribbed, annlar plate A2 thus formed then may be severed lengthwise, and, togther with the heads of the T-shape ribs 19, flattened as shown in FIG. 4, thereby comprising the flat, ribbed panel A3.

Figure 6:
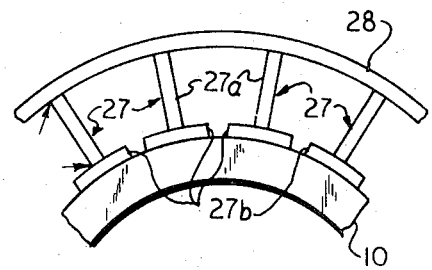
Figure 7:
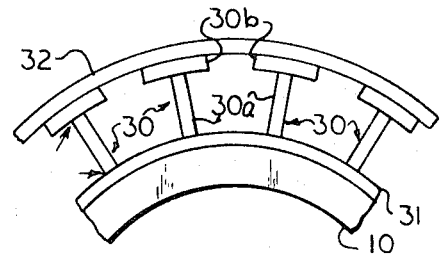

FIGS. 5, 6 and 7 show three alternate arrangements for providing either one or two ribbed, annular plate-like members in accordance with the invention.

In FIG. 5 inner and outer annular members 20 and 21 of selected different diameters and generally similar to those shown in FIGS. 1 and 2, are mounted in radially spaced relation, with the nner one 20 fitted around a thermally expansible mandrel 10 substantially as shown in FIG. 1. A first plurality of initially two part, T-shape rib assemblies 22, each comprising a radially positioned stem portion 22a and head portion 22b on the radially outer end thereof, are fitted, spoke like, in symmetrically spaced relation between the annular members 20 and 21.

A second plurality of generally similar T-shape rib assemblies 23 are fitted in relatively inverted position, and medially interposed relation, between the rib members 22. Both ends of the stem portions 22a and 23a of both assemblies 22 and 23, indicated by arrows in FIG. 5, are plated with plating material, while the radially outer surface of each head portion 22b, and the radially inner surface of each head portion 23b are coated with suitable braze stop-off compound to prevent bonding in these areas. The entire assembly shown in FIG. 5 is then subjected to bonding as explained in connection with the description of FIGS. 1 — 4, whereby the stems 22a and 23a are integrally bonded to their respective annular members 20 and 21, and also to their respective head portions 22b and 23b.

The mandrel 10 is then withdrawn and the annular members 20 and 21, with their respective T-shaped ribs 22 and 23 integrally bonded thereto, may then be withdrawn axially from each other, and the annular portions 20 and 21 severed and flattened to comprise ribbed panels substantially as shown in FIG. 4.

In FIG. 6 a plurality of T-shape rib assemblies 27 are fitted, heads in, between an outer annular member 28 and mandrel 10, both ends of the stem portion 27a of each rib assembly being plated with plating material. The radially inner surface of each head portion 27b is coated with braze stop-off compound. The assembly A4 shown in FIG. 6 is then subjected to bonding to integrally bond the heads 27b to their respective stems 27a, and the latter to the annular member 28. The annular member 28, with the T-shape ribs 27 thus integrally bonded thereto, may then be severed and flattened to comprise a ribbed panel as explained previously herein.

An arrangement generally similar in principle to that shown in FIG. 6 is shown in FIG. 7, wherein a plurality of T-shape rib assemblies 30 are fitted between inner and outer annular plate like members 31 and 32, the inner member 31 being fitted onto an expansible mandrel 10. Plating metal is applied to both ends of the stem 30a of each T-shape rib assembly, and brazing stop-off compound is applied to the radially outer side of the head 30b of each rib assembly. The entire assembly of FIG. 7 is then subjected to bonding to bond the stems 30a to their respective heads 30b, and also to the inner annular member 31. The core 10 and outer annular member 32 are then withdrawn, leaving the inner annular member 31 with the ribs 30 integrally bonded thereto.

Figure 8:
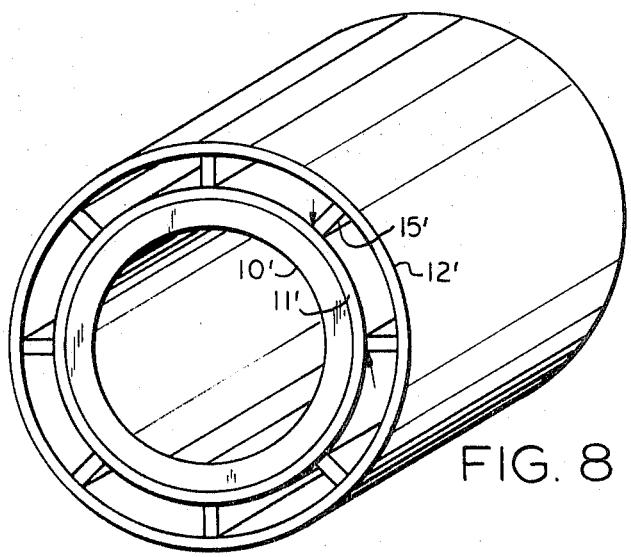
FIG. 8 is a perspective view of a further modfied arrangement for practicing the invention.
Figure 9:
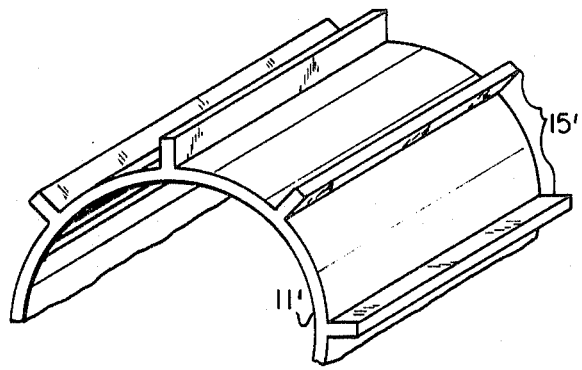
FIG. 9 is a fragmentary view of the arrangement of FIG. 8 upon completion of the bonding operation and withdrawal of the core and outer annular member.

In the form of the invention shown in FIGS. 8 and 9, the various parts are assembled substantially as shown in FIGS. 1 and 2, wherein corresponding parts are designated by the same reference numbers as in FIGS. 1 and 2 with the prime (') added. However, in assembling the parts in FIG. 8, only the radially inner ends of the rib members 15' are plated, while their outer ends are coated with braze stop-off compound. Therefore, after the bonding has been completed, the mandrel 10' withdrawn, and the inner annular member 11', with the ribs 15' integrally bonded thereto, is withdrawn from the outer member 12' and appears as shown in FIG. 9. Thereafter the ribbed, inner, annular member 12' may be severed and flattened to provide a ribbed panel in the general manner shown in FIG. 4 and described previously herein.

The invention provides a simple and effective method for providing uniform, bonded, ribbed panels, which method lends itself to use for use either in single lots or large production, and requires a minimum of manufacturing equipment.

Having thus described my invention, what I claim as new and useful and desire to protect by U. S. Letters Patent is:

1. The method of making a ribbed panel which comprises;

assembling a first annular, metal, plate-like member in fitted relation around a mandrel, assembling a second annular, metal, plate-like member of larger diameter than the first in selected, radially outwardly spaced relation about said first annular member, the mandrel having a greater coefficient of thermal expansion than at least the outer annular member, fitting a plurality of rib members, spoke-like, and in selected, circumferentially spaced relation, into the space between the two annular members, at least one radially directed surface of each of a selected plurality of the rib members contacting at least one of the annular members and being plated with a brazing type plating metal, the area of said at least one annular member in contact with each such plated rib member surface being clean, subjecting the assembly of core, annular members and rib members to heating in accordance with selected diffusion bonding procedures, thereby to expand the mandrel and the inner annular member and place the rib members under compression between the annular members so as to bond by diffusion bonding the plated end of each selected rib to said at least one annular member, cooling the assembly and removing the mandrel, severing said one annular member between two adjacent selected rib members, freeing the ends of the selected rib members directed toward the other annular member for movement toward and away from each other, and flattening said one annular member to a selected degree to form such ribbed panel.

2. The method claimed in claim 1 wherein, in assembling the parts preparatory to heating, the mandrel is substantially cylindrical and is mounted in axially upright position. an annular shelf is provided around the exterior of the mandrel, the inner and outer annular memers are supported on the shelf, a plurality of rib positioning members of heat resistant material of a type noncontaminating to the annular and rib members are assembled in circumferentially spaced relation in the annular space between the inner and outer annular members, and the ribs are supported on the shelf and interposed for positioning, rib-like, in the spaces between adjacent ones of the positioning members.

3. The method claimed in claim 1 wherein selected ones of the rib members are diffusion bonded at one common, radially directed end thereof to said one annular member, and at the other radially directed end thereof to the said other annular member, and, upon completion of the diffusion bonding of the plated ends of the selected ribs to the two annular members, said at least one annular member is severed between each adjacent pair of the ribs, whereby each rib member forms the stem portion, and a fragment of the severed annular member bonded to each stem portion comprises the head poltion of a T-shape rib bonded to the other annular member, and said other annular member is then flattened to a selected degree to form a ribbed panel with T-shape ribs.

4. The method claimed in claim 1 wherein each rib member comprises a T-shape assembly comprising a stem portion and a head portion and the head portion of each such assembly is interposed between, and in engagement with, its respective stem portion and a selected one of the annular members, the stem portion of each T-shape assembly being plated for bonding at one end thereof to one side of its respective head portion, and at the other end thereof to said one annular member, and the radially directed side of each head portion opposite to that in engagement with its respective stem portion being coated with braze stop-off compound.

5. The method claimed in claim 4 wherein all of the head portions of the T-shape rib assemblies are on a common, radially directed end of all of their respective stem portions.

6. The method claimed in claim 4 wherein the head portions of alternate T-shape rib assemblies are on opposite radially directe ends of their respective stem portions.

7. The method claimed in claim 1 wherein the inner annular member comprises a plurality of circumferentially spaced segments, each segment interposed between the mandrel and one of the rib members.

8. The method defined in claim 1 wherein one radially directed end of each of such selected plurality of rib members is plated with a brazing type plating metal for diffusion bonding to the annular member engaged by each such plated end, and the other radially directed end of each such rib member is coated with braze stop-off compound.

9. The method claimed in claim 8 wherein all of the plated ends of the selected rib members are directed in a common radial direction.

* * * * *